(12) United States Patent
Ishizaki et al.

(10) Patent No.: US 11,443,903 B2
(45) Date of Patent: Sep. 13, 2022

(54) SOLID ELECTROLYTIC CAPACITOR HAVING AN INSULATING LAYER BETWEEN EXPOSED ANODE PORTIONS

(71) Applicant: PANASONIC INTELLECTUAL PROPERTY MANAGEMENT CO., LTD., Osaka (JP)

(72) Inventors: Katsuhisa Ishizaki, Kyoto (JP); Yuta Amiuchi, Osaka (JP); Yoshio Yamamura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/083,888

(22) Filed: Oct. 29, 2020

(65) Prior Publication Data
US 2021/0043393 A1    Feb. 11, 2021

Related U.S. Application Data

(63) Continuation of application No. 15/945,789, filed on Apr. 5, 2018, now Pat. No. 10,861,653, which is a
(Continued)

(30) Foreign Application Priority Data

Oct. 28, 2015   (JP) .............................. JP2015-211890

(51) Int. Cl.
*H01G 9/15*    (2006.01)
*H01G 9/012*   (2006.01)
(Continued)

(52) U.S. Cl.
CPC ............. *H01G 9/15* (2013.01); *H01G 9/0029* (2013.01); *H01G 9/012* (2013.01); *H01G 9/04* (2013.01); *H01G 9/048* (2013.01); *H01G 9/07* (2013.01)

(58) Field of Classification Search
CPC .......... H01G 9/15; H01G 9/04; H01G 9/0029; H01G 9/01; H01G 9/07; H01G 9/048
See application file for complete search history.

(56) References Cited

U.S. PATENT DOCUMENTS 6,320,742 B1   11/2001   Wada et al.
7,289,314 B2   10/2007   Kobayashi et al.
(Continued)

FOREIGN PATENT DOCUMENTS

CN   1469403 A     1/2004
CN   103003901 A   3/2013
(Continued)

OTHER PUBLICATIONS

Non-Final Office Action issued in U.S. Appl. No. 15/945,789, dated Nov. 27, 2019.
(Continued)

*Primary Examiner* — David M Sinclair
(74) *Attorney, Agent, or Firm* — McDermott Will & Emery LLP

(57) ABSTRACT

A solid electrolytic capacitor includes a plurality of capacitor elements that are laminated with each other. The plurality of capacitor elements each include an anode body, a solid electrolyte layer, and a cathode lead-out layer. The anode body is a foil-shaped electric conductor having a first main surface and a second main surface opposite to the first main surface. The anode body includes an anode section, a cathode formation section, and a separation section interposed between the anode section and the cathode formation
(Continued)

section. The solid electrolyte layer and the cathode lead-out layer are disposed on both the first and the second main surfaces of the cathode formation section. A first insulating layer is disposed on the first main surface of the separation section. A first capacitor element and a second capacitor element that are adjacent to each other among the plurality of the capacitor elements are stacked so that the first insulating layer in the first capacitor element faces the second main surface of the separation section in the second capacitor element.

7 Claims, 4 Drawing Sheets

Related U.S. Application Data continuation of application No. PCT/JP2016/004620, filed on Oct. 19, 2016.

(51) Int. Cl.
*H01G 9/07* (2006.01)
*H01G 9/048* (2006.01)
*H01G 9/04* (2006.01)
*H01G 9/00* (2006.01)

(56) References Cited

U.S. PATENT DOCUMENTS

| | | | |
|---|---|---|---|
| 2003/0007311 A1* | 1/2003 | Kojima | H01G 9/012 361/302 |
| 2004/0027789 A1 | 2/2004 | Kochi et al. | |
| 2006/0181836 A1* | 8/2006 | Furuzawa | H01G 9/15 361/523 |
| 2007/0247781 A1 | 10/2007 | Baba et al. | |
| 2009/0080144 A1 | 3/2009 | Matumoto et al. | |
| 2009/0135550 A1 | 5/2009 | Umemoto et al. | |
| 2010/0246100 A1* | 9/2010 | Umemoto | H01G 9/15 361/535 |
| 2013/0010404 A1 | 1/2013 | Chiu et al. | |
| 2013/0114184 A1* | 5/2013 | Kochi | H01G 9/012 361/524 |
| 2016/0196924 A1* | 7/2016 | Tokuhara | H01G 9/0036 216/6 |

FOREIGN PATENT DOCUMENTS

| | | |
|---|---|---|
| JP | 2004-088073 A | 3/2004 |
| JP | 2006-156681 A | 6/2006 |
| JP | 2008-066430 A | 3/2008 |
| JP | 2008-262950 A | 10/2008 |
| JP | 2009-129936 A | 6/2009 |
| JP | 2009-194263 A | 8/2009 |
| JP | 2010-177467 A | 8/2010 |
| JP | 2011-249632 A | 12/2011 |
| WO | 2009/104377 A1 | 8/2009 |

OTHER PUBLICATIONS

Final Office Action issued in U.S. Appl. No. 15/945,789, dated Apr. 17, 2020.
Non-Final Office Action issued in U.S. Appl. No. 15/945,789, dated Jul. 16, 2020.
Notice of Allowance issued in U.S. Appl. No. 15/945,789, dated Sep. 16, 2020.
International Search Report of PCT application No. PCT/JP2016/004620 dated Jan. 10, 2017.
English Translation of Chinese Office Action dated May 6, 2022 for the related Chinese Patent Application No. 202011175946.3.

* cited by examiner

SOLID ELECTROLYTIC CAPACITOR HAVING AN INSULATING LAYER BETWEEN EXPOSED ANODE PORTIONS

CROSS-REFERENCE OF RELATED APPLICATIONS

This application is a Continuation of U.S. patent application Ser. No. 15/945,789, filed on Apr. 5, 2018, which is a Continuation of International Patent Application No. PCT/JP2016/004620, filed on Oct. 19, 2016, which in turn claims the benefit of Japanese Application No. 2015-211890, filed on Oct. 28, 2015, the entire disclosures of which Applications are incorporated by reference herein.

BACKGROUND

1. Technical Field

The present disclosure relates to solid electrolytic capacitors, and particularly to a solid electrolytic capacitor including a plurality of laminated capacitor elements.

2. Description of the Related Art

Solid electrolytic capacitors are mounted to various electronic devices because of their lower equivalent series resistance (ESR) and excellent frequency characteristics. An anode body of a capacitor element for use in solid electrolytic capacitors is made of foil containing titanium, tantalum, aluminum, niobium, or other valve metal, for example. A dielectric layer is formed on two main surfaces of the foil-shaped anode body. The anode body provided with the dielectric layer includes an anode section, a cathode formation section, and a separation section interposed between the anode section and the cathode formation section. A solid electrolyte layer is formed on two main surfaces of the cathode formation section. The solid electrolyte layer is covered at least partially with a cathode lead-out layer. The cathode formation section, the solid electrolyte layer, and the cathode lead-out layer constitute a cathode region of the capacitor element. The cathode region is connected to a cathode terminal. The anode section constitutes an anode region of the capacitor element. The anode region is connected to an anode terminal. An insulation material (an insulating layer) is disposed on two main surfaces of the separation section. The cathode region and the anode region are separated by the insulating layer disposed on the two main surfaces of the separation section (as is disclosed in Unexamined Japanese Patent Publication No. 2004-088073, for example).

SUMMARY

A solid electrolytic capacitor according to a first aspect of the present disclosure includes a plurality of capacitor elements that are laminated with each other. The plurality of capacitor elements each include an anode body having a dielectric layer, a solid electrolyte layer covering a part of the dielectric layer, and a cathode lead-out layer covering at least a part of the solid electrolyte layer. The anode body is a foil-shaped electric conductor having a first main surface and a second main surface opposite to the first main surface. The anode body includes an anode section, a cathode formation section, and a separation section interposed between the anode section and the cathode formation section. The solid electrolyte layer and the cathode lead-out layer are disposed on both the first main surface of the cathode formation section and the second main surfaces of the cathode formation section. A first insulating layer is disposed on the first main surface of the separation section. A first capacitor element and a second capacitor element that are adjacent to each other among the plurality of capacitor elements are stacked so that the first insulating layer in the first capacitor element faces the second main surface of the separation section the second capacitor element.

A solid electrolytic capacitor according to a second aspect of the present disclosure includes a plurality of capacitor elements that are laminated with each other. The plurality of capacitor elements each include an anode body having a dielectric layer, a solid electrolyte layer covering a part of the dielectric layer, and a cathode lead-out layer covering at least a part of the solid electrolyte layer. The anode body has a first main surface and a second main surface opposite to the first main surface. The anode body includes an anode section, a cathode formation section, and a separation section interposed between the anode section and the cathode formation section. The solid electrolyte layer and the cathode lead-out layer are disposed on both the first main surface of the cathode formation section and the second main surfaces of the cathode formation section. A first insulating layer is disposed on the first main surface of the separation section. A second insulating layer is disposed on the second main surface of the separation section. A thickness of the second insulating layer is smaller than a thickness of the first insulating layer. A first capacitor element and a second capacitor element that are adjacent to each other among the plurality of capacitor elements are stacked so that the first insulating layer in the first capacitor element faces the second insulating layer in the second capacitor element.

According to a third aspect of the present disclosure, a method for manufacturing a solid electrolytic capacitor including a plurality of capacitor elements that are laminated with each other, the method includes steps below. A first step is preparing an anode body having a dielectric layer, the anode body having a foil-shape and having a first main surface and a second main surface opposite to the first main surface. A second step is forming a first insulating layer on a part of each of the first main surface and the second main surfaces so that each of the first main surface and the second main surface is separated into a first region and a second region. A third step is forming a solid electrolyte layer and a cathode lead-out layer the first main surface and the second main surface of the first region. A fourth step is removing, after the third step, the first insulating layer from the second main surface to obtain a capacitor element. And a fifth step is stacking the plurality of capacitor elements. In the fifth step, the plurality of capacitor elements are stacked so that the first insulating layer of one of the mutually adjacent capacitor elements faces the second main surface of the other adjacent capacitor element. The second main surface of the other adjacent capacitor element has none of the first insulating layer because the first insulating layer is removed.

A solid electrolytic capacitor according to the present disclosure can include an increased number of laminated capacitor elements without any rise in a thickness of a capacitor element group. The solid electrolytic capacitor decreases stress applied to the capacitor elements and prevents the occurrence of a positional discrepancy between the laminated capacitor elements.

DETAILED DESCRIPTION OF EMBODIMENT

Prior to describing exemplary embodiments of the present disclosure, problems with a conventional solid electrolytic capacitor will be briefly described.

Figure 7:
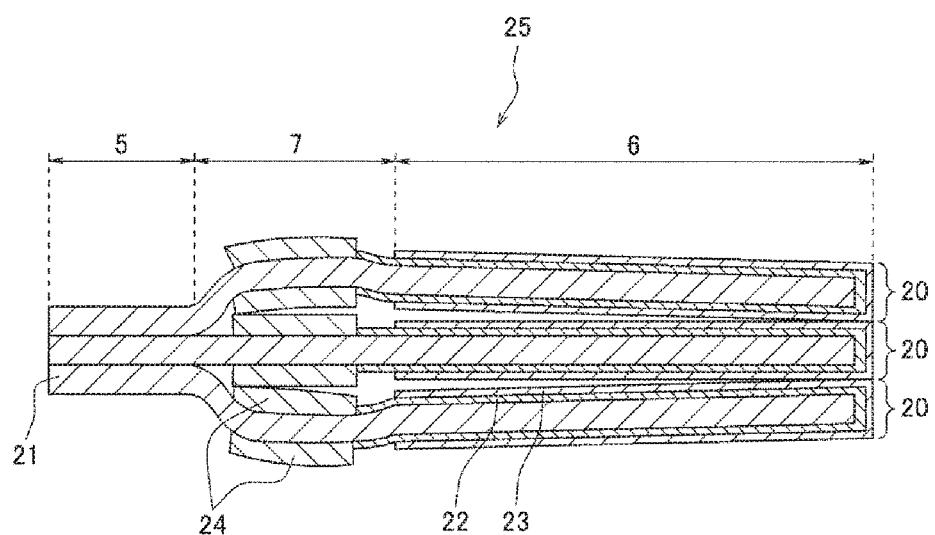
FIG. 7 is a schematic cross-sectional view illustrating a capacitor element group made up of a plurality of laminated conventional capacitor elements.

In accordance with increasing functionality of electronic devices, high-capacitance solid electrolytic capacitors have been required. With reference to FIG. 7, a solid electrolytic capacitor developed in response to this need includes capacitor element group 25 made up of a plurality of laminated sheet-shaped capacitor elements 20 (three sheets in the example drawing). In each capacitor element 20, solid electrolyte layer 22, cathode lead-out layer 23, and insulating layer 24 are disposed on foil-shaped anode body 21. Anode regions 5 of respective capacitor elements 20 are joined together such that anode regions 5 are electrically connected to one another.

In capacitor element 20, anode region 5 differs from separation region 7 in thickness by a film thickness of insulating layer 24. Separation region 7 differs from cathode region 6 in thickness by a difference between the film thickness of insulating layer 24 and a total film thickness of cathode lead-out layer 23 and solid electrolyte layer 22. Thus, stress is applied to capacitor elements 20 both at a boundary between anode region 5 and separation region 7 and a boundary between separation region 7 and cathode region 6 due to the joining of anode sections 5 as a result of lamination of the plurality of capacitor elements 20. This can cause an increase in leakage current and a positional discrepancy between laminated capacitor elements 20.

As shown in FIG. 7, joining together of anode bodies 21 in anode region 5 can create a gap between anode bodies 21 in separation region 7 or cathode region 6. In this case, the gap increases a thickness of capacitor element group 25. In recent years, the downsizing of electronic devices has led to a decrease in space for disposition of solid electrolytic capacitors. The disposition of a solid electrolytic capacitor in a predetermined space may necessitate a decrease in the number of laminated capacitor elements in consideration of a gap created in separation region 7 or cathode region 6. This may inhibit an increase in the capacitance of the solid electrolytic capacitor.

A first solid electrolytic capacitor according to the present disclosure includes a plurality of laminated capacitor elements (a capacitor element group). The capacitor elements each include an anode body having a dielectric layer, a solid electrolyte layer covering a part of the dielectric layer, and a cathode lead-out layer covering at least a part of the solid electrolyte layer. The anode body has a first main surface and a second main surface opposite to the first main surface. The anode body includes an anode section, a cathode formation section, and a separation section interposed between the anode section and the cathode formation section.

The solid electrolyte layer and the cathode lead-out layer (hereinafter sometimes collectively referred to as a cathode layer) are disposed on both the first and the second main surfaces of the cathode formation section. A first insulating layer is disposed on the first main surface of the separation section, whereas no insulating layer is disposed on the second main surface of the separation section. The capacitor elements are stacked such that the first insulating layer of one of the two mutually adjacent capacitor elements faces the second main surface of the separation section of the other adjacent capacitor element.

A second solid electrolytic capacitor according to the present disclosure differs from the first solid electrolytic capacitor in that a second insulating layer thinner than the first insulating layer is formed on a second main surface of a separation section of the second solid electrolytic capacitor.

The capacitor elements each include an anode region, a separation region, and a cathode region. The anode region is made up of a part (an anode section) of the anode body. The separation region is made up of a separation section of the anode body and a first insulating layer (as well as a second insulating layer) disposed on respective main surfaces of the separation section. The cathode region is made up of a cathode formation section of the anode body and a cathode layer disposed on both main surfaces of the cathode formation section.

The cathode layer is formed after formation of the insulating layers on the two main surfaces of the separation section. As a result, the capacitor element is separated into the anode region and the cathode region that has the cathode layer. A thickness of the insulating layer should preferably be greater than a thickness of the cathode layer such that the anode region is clearly separated from the cathode region.

After stacking of the plurality of the capacitor elements, the anode sections are joined together at ends of the anode regions (ends of the capacitor elements) by welding, swaging, or other technique such that the anode regions are electrically connected to each other. With reference to FIG. 7, if thick insulating layers 24 are disposed on both main surfaces of each anode body, the capacitor element group has a bulge in separation region 7 in terms of shape. This configuration readily causes a gap between cathode regions 6, increases a thickness of the capacitor element group, and results in a positional discrepancy between the capacitor elements. This configuration can also apply stress to the capacitor elements both at a boundary between anode region 5 and separation region 7 and a boundary between separation region 7 and cathode region 6, and thus increase leakage current. These events can more readily take place with an increase in the number of the laminated elements.

In the capacitor element group, the insulating layer also serves to prevent a short circuit between the anode section in one of two adjacent capacitor elements and the cathode layer in the other adjacent capacitor element. A configuration that readily causes a positional discrepancy between capacitor elements as described above also readily leads to a short circuit between the capacitor elements. Thus, the disposition of an insulating material with a satisfactory thickness between capacitor elements is important in terms of improved reliability. Meanwhile, insulating layers disposed on both main surfaces of a capacitor element as described above can cause a positional discrepancy.

In order to solve this problem, an insulating layer (a first insulating layer) is disposed only on one of main surfaces of an anode body. Alternatively, the first insulating layer is disposed on one of the main surfaces while an insulating layer (a second insulating layer) that is thinner than the first insulating layer is disposed on the other main surface. This configuration reduces the occurrence of a gap between capacitor elements. This, in turn, allows an increase in the number of the laminated capacitor elements and reduces the possibility of a positional discrepancy between the capacitor elements.

Moreover, a plurality of the capacitor elements are stacked such that the main surface (the first main surface) of one of the adjacent capacitor elements faces the main surface (the second main surface) of the other adjacent capacitor element, wherein the first insulating layer is formed on the first main surface and none of the first insulating layer is formed on the second main surface. As a result, the first insulating layer disposed on one of the adjacent capacitor elements faces the second main surface of the separation section of the other adjacent capacitor element. At least a part of the first insulating layer of one of the adjacent capacitor elements can be in contact with the second main surface of the separation section of the other adjacent capacitor element. This configuration prevents the occurrence of a short circuit between the capacitor elements. If the second insulating layer is formed on the second main surface, the thicker first insulating layer of the adjacent capacitor element overlaps the second insulating layer and thereby contributes to an enhanced effect in short circuit prevention. This configuration also prevents the occurrence of a positional discrepancy between the capacitor elements because an end of the first insulating layer of one of the mutually adjacent capacitor elements faces a separation region-side end of the cathode layer of the other capacitor element such that the two ends fit tightly together.

Hereinafter, a configuration of a solid electrolytic capacitor according to the present disclosure is described in more detail.

Capacitor Element

A capacitor element includes a foil-shaped anode body having a dielectric layer, a solid electrolyte layer covering a part of the dielectric layer, and a cathode lead-out layer covering at least a part of the solid electrolyte layer. No particular limitation is placed on a thickness of the capacitor element. The thickness of the capacitor element may range from 60 µm to 350 µm inclusive, for example. The thickness of the capacitor element is a thickness of the thickest part within a cathode region of the capacitor element in a direction of the normal to a first main surface of the capacitor element.

The capacitor element includes: an anode region made up of an anode section (described later) of the anode body; a separation region made up of a separation section of the anode body and a first insulating layer (as well as a second insulating layer) disposed on respective main surfaces of the separation section; and the cathode region made up of a cathode formation section of the anode body and a cathode layer disposed on both main surfaces of the cathode formation section.

(Anode Body)

The anode body contains a valve metal as a conductive material. The anode body is foil (metallic foil) having a first main surface and a second main surface opposite to each other. As describe above, the anode body has three divided sections according to layers disposed on the main surfaces of the respective sections. The three sections are an anode section, a cathode formation section, and a separation section interposed between the anode section and the cathode formation section.

The surfaces of the anode body may be roughened. The valve metal of the anode body may be a valve metal contained in an alloy, a compound, or other mixture. Preferable examples of the valve metal include titanium, tantalum, aluminum, and niobium. The valve metal of the anode body may be any one of these metals or a combination of two or more of these metals. No particular limitation is placed on a thickness of the anode body. The thickness of the anode body may range from 50 µm to 250 µm, inclusive, for example.

The separation section may have a recess that is dented in a thickness direction of the separation section. The "thickness direction" herein denotes a direction normal to a main surface of the anode body. Preferably, the recess should be formed by compressing the roughened anode body in the thickness direction. The roughened anode body includes many pores or pits formed on its surfaces.

These pores or pits are flattened by compression of at least a part of the separation section in the thickness direction. A raw material for the solid electrolyte layer is unlikely to penetrate into the recess having the flattened pores or pits at the time of formation of the solid electrolyte layer. Thus, this configuration helps to prevent the solid electrolyte layer from being formed on sections other than the cathode formation section.

The recess also absorbs a thickness of the first insulating layer and thus contributes to a reduction in the overall thickness of a capacitor element group. In addition, the recess facilitates reduction in the stress applied to the capacitor elements and helps to prevent the occurrence of a positional discrepancy between the laminated capacitor elements. No particular limitation is placed on the recess in terms of depth (distance in the thickness direction of the separation section). It is preferable from the viewpoint of maintained strength that the depth of the recess be no greater than a thickness of the roughened region. The depth of the recess may range from 10 µm to 100 µm, inclusive, for example.

(Dielectric Layer)

The dielectric layer is formed by anodizing, through an anodizing treatment or the like, the surfaces of the anode body. Thus, the dielectric layer can contain an oxide of the valve metal. For example, if the valve metal is aluminum, the dielectric layer can contain $Al_2O_3$. The dielectric layer may be any layer other than these examples, with proviso that the layer functions as a dielectric. If the surfaces of the anode body are roughened, the dielectric layer can be formed along inner all surfaces of the pores or pits on the surfaces of the anode body.

(Solid Electrolyte Layer)

The solid electrolyte layer is formed so as to cover a part of the dielectric layer. If the surfaces of the anode body are roughened, the solid electrolyte layer is also formed on the dielectric layer including a portion formed on the inner wall surfaces of the pores or pits.

Examples of the material for the solid electrolyte layer include manganese compounds and conductive polymers.

The conductive polymers may be polypyrrole, polythiophene, polyfuran, polyaniline, polyacetylene, polyphenylene, polyphenylene vinylene, polyacene, and/or polythiophene vinylene, and derivatives of these polymers, for example. The solid electrolyte layer including a conductive polymer can be formed through, for example, chemical polymerization and/or electrolytic polymerization of a raw material monomer on the dielectric layer. Alternatively, the solid electrolyte layer including a conductive polymer can be formed by coating the dielectric layer with a solution in which the conductive polymer is dissolved or a dispersion liquid in which the conductive polymer is dispersed. No particular limitation is placed on a thickness of the solid electrolyte layer. The thickness of the solid electrolyte layer may range from 2 μm to 50 μm, inclusive, for example.

(Cathode Lead-Out Layer)

The cathode lead-out layer, for example, includes a carbon layer and a metal (e.g., silver) paste layer formed on a surface of the carbon layer. The carbon layer is formed so as to cover at least a part of the solid electrolyte layer. The carbon layer is formed of a composition including a conductive carbon material such as graphite. The metal paste layer is formed of, for example, a composition including silver particles and a resin. The cathode lead-out layer is not limited to this configuration and is satisfactory as long as the cathode lead-out layer is configured to have a function of current collection. No particular limitation is placed on a thickness of the cathode lead-out layer. The thickness of the cathode lead-out layer may range from 2 μm to 50 μm, inclusive, for example.

(First Insulating Layer)

The first insulating layer is disposed so as to cover at least a part of the first main surface of the separation section and such that the anode region and the cathode region of the capacitor element are separated from each other. The first insulating layer is formed from an insulating material. Examples of the insulating material include epoxy resin, phenol resin, silicone resin, melamine resin, urea resin, alkyd resin, polyurethane, polyimide, polyamide-imide, and unsaturated polyester.

Preferably, a thickness of the first insulating layer should be greater than a thickness of the cathode layer that is a total thickness of the solid electrolyte layer and the cathode lead-out layer. This configuration readily provides isolation between the anode region and the cathode layer formed on the cathode formation section. This configuration also facilitates the engagement of an end of the first insulating layer disposed on one of the mutually adjacent capacitor elements with a separation region-side end of the cathode layer of the other capacitor element if the capacitor elements are stacked on each other such that the first insulating layer faces the second main surface of the separation section of the other capacitor element. This, in turn, contributes to improved effectiveness in prevention of a positional discrepancy between the capacitor elements. The thickness of the first insulating layer may range from 10 μm to 70 μm, inclusive, for example.

If the surfaces of the anode body are roughened, the first insulating layer preferably contain silicone as an ingredient particularly in terms of helping to prevent the solid electrolyte layer from crawling up. Silicone leaching out from the first insulating layer clogs pores or pits on the surface of the anode body. This prevents a material for the solid electrolyte layer from penetrating into the anode body at the time of formation of the solid electrolyte layer. Thus, this configuration prevents the solid electrolyte layer from being formed on parts other than the cathode formation section.

(Second Insulating Layer)

The second insulating layer is disposed, if needed, so as to cover at least a part of the second main surface of the separation section. The second insulating layer is formed from an insulating material that is similar to the material for the first insulating layer.

A thickness of the second insulating layer is smaller than the thickness of the first insulating layer. Preferably, the thickness of the second insulating layer should be smaller than the thickness of the cathode layer. From the viewpoint of reducing the thickness of the capacitor element group, the thickness of the second insulating layer should preferably be less than 70% of and more preferably be less than 15% of the thickness of the first insulating layer. Specifically, the thickness of the second insulating layer ranges from 0.1 μm to 10 μm, inclusive, for example.

It is preferable that the second insulating layer be disposed so as to cover at least a part of the cathode layer as well. If the solid electrolyte layer extends off the cathode lead-out layer, the second insulating layer should preferably be disposed so as to cover at least the extended part of the solid electrolyte layer. This configuration prevents degradation of the solid electrolyte layer. This configuration also improves effectiveness in prevention of a short circuit between the capacitor elements in the capacitor element group.

Solid Electrolytic Capacitor

A solid electrolytic capacitor includes a capacitor element group, an exterior body to encapsulate the capacitor element group, an anode terminal electrically connected to anode regions of capacitor elements, and a cathode terminal electrically connected to cathode regions of the capacitor elements.

(Capacitor Element Group)

The capacitor element group is formed of a plurality of capacitor elements. The capacitor elements each include a first main surface having a first insulating layer formed thereon and a second main surface having none of the first insulating layer. The capacitor elements are stacked such that the first main surface of one of the mutually adjacent capacitor elements faces the second main surface (or a second insulating layer) of the other adjacent capacitor element. Accordingly, the first insulating layer disposed on one of the adjacent capacitor elements faces the second main surface (or the second insulating layer) on a separation section of the other adjacent capacitor element. This configuration, as described above, prevents the occurrence of any of a short circuit and a positional discrepancy between the capacitor elements.

No particular limitation is placed on a number of the laminated capacitor elements. The number of the laminated capacitor elements may range from 2 to 15, for example. The anode regions of the respective capacitor elements are swaged and integrated together by a swaging component, for example, such that these regions are joined and electrically connected to each other. The anode regions may be joined together by laser welding or resistance welding other than the swaging component.

(Anode Terminal)

The anode terminal is electrically connected to the anode regions of the capacitor elements. The material for the anode terminal is not particularly limited as long as the material is electrochemically and chemically stable and conductive. As such, the material for the anode terminal may be metal or nonmetal. No particular limitation is placed on shape of the anode terminal. A thickness of the anode terminal (a distance between main surfaces of the anode terminal) ranges from 25 μm to 200 μm, inclusive, for example, and may range from 25 μm to 100 μm, inclusive.

Preferably, the anode terminal should be joined to the first main surfaces of the anode regions of at least one of the capacitor elements of the capacitor element group. This configuration helps to prevent the occurrence of a short circuit between the anode terminal and the cathode region of the capacitor element owing to the first insulating layer disposed on the first main surface of the capacitor element.

No particular limitation is placed on a choice for the capacitor element joined to the anode terminal. If the exterior body exposes a part of the anode terminal to an outside of the solid electrolytic capacitor, the anode terminal preferably be joined to the first main surface of a capacitor element that is at an end of the capacitor element group and that is disposed such that the first main surface faces the outside of the capacitor. This configuration helps the exterior body to expose the anode terminal.

The anode terminal may be joined to the anode region through any of a conductive adhesive and solder or by any of resistance welding and laser welding. The conductive adhesive is a mixture of an insulating material as described above and carbon or metal particles, for example.

(Cathode Terminal)

The cathode terminal is electrically connected to the cathode regions of the capacitor elements. The material for the cathode terminal is not particularly limited as long as the material is electrochemically and chemically stable and conductive. As such, the material for the cathode terminal may be metal or nonmetal. No particular limitation is placed on shape of the cathode terminal. A thickness of cathode terminal 14 ranges from 25 μm to 200 μm, inclusive, for example, and may range from 25 μm to 100 μm, inclusive.

Preferably, the cathode terminal should be joined to the first main surfaces of the cathode regions of at least one of the capacitor elements of the capacitor element group. This configuration prevents the occurrence of a short circuit between the cathode terminal and the anode region of the capacitor element owing to the first insulating layer disposed on the first main surface of the capacitor element.

No particular limitation is placed on a choice for the capacitor element joined to the cathode terminal. If the exterior body exposes a part of the cathode terminal to the outside of the solid electrolytic capacitor, the cathode terminal should preferably be joined to the first main surface of a capacitor element that is at an end of the capacitor element group and that is disposed such that the first main surface faces the outside of the capacitor. This configuration helps the exterior body to expose the cathode terminal. In this case, both the anode terminal and the cathode terminal are joined to an identical capacitor element. The cathode terminal may be joined to the cathode layer through any of the conductive adhesive and solder as described above.

Exterior Body

The exterior body is provided to electrically insulate the capacitor element group from the outside and thus includes an insulating material. The exterior body is formed from the insulating material as described above, for example. If the exterior body exposes a part of the anode terminal and a part of the cathode terminal to the outside of the capacitor, the exterior body also serves to prevent a short circuit between the anode terminal and the cathode terminal.

FIRST EXEMPLARY EMBODIMENT

Figure 1:
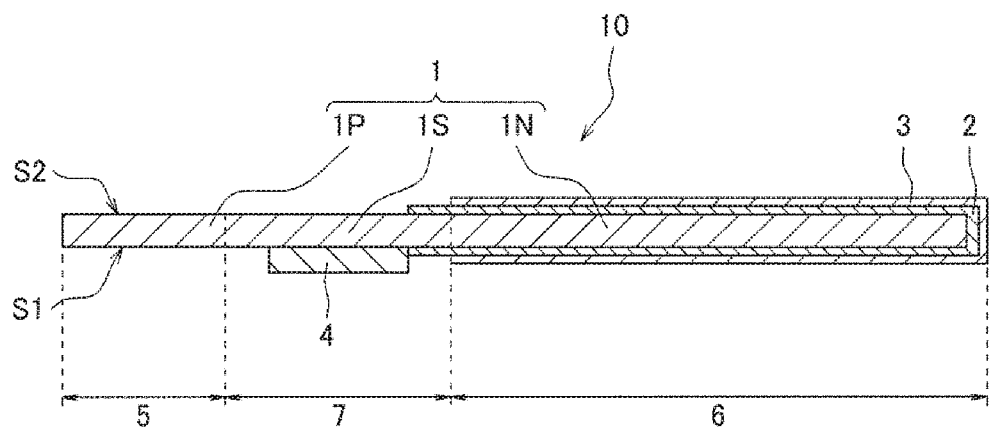
FIG. 1 is a schematic cross-sectional view illustrating a capacitor element according to a first exemplary embodiment of the present disclosure.
Figure 2:
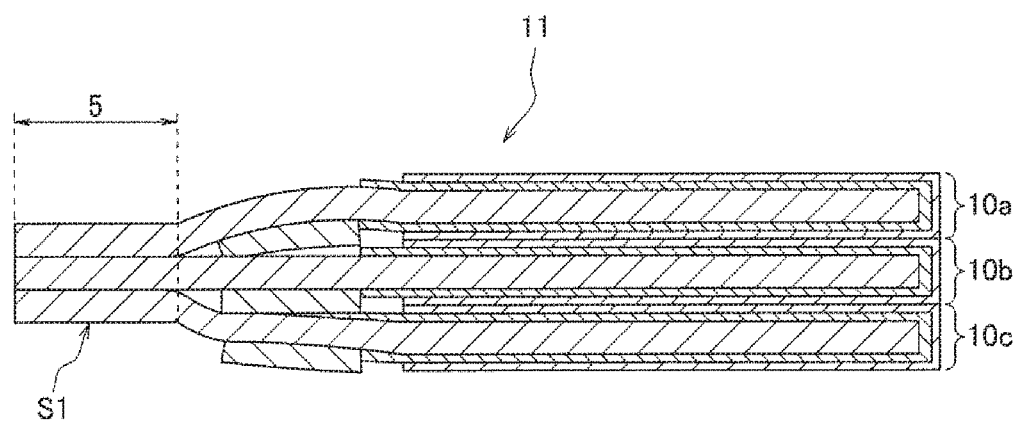
FIG. 2 is a schematic cross-sectional view illustrating a capacitor element group made up of a plurality of the laminated capacitor elements of FIG. 1.
Figure 3:
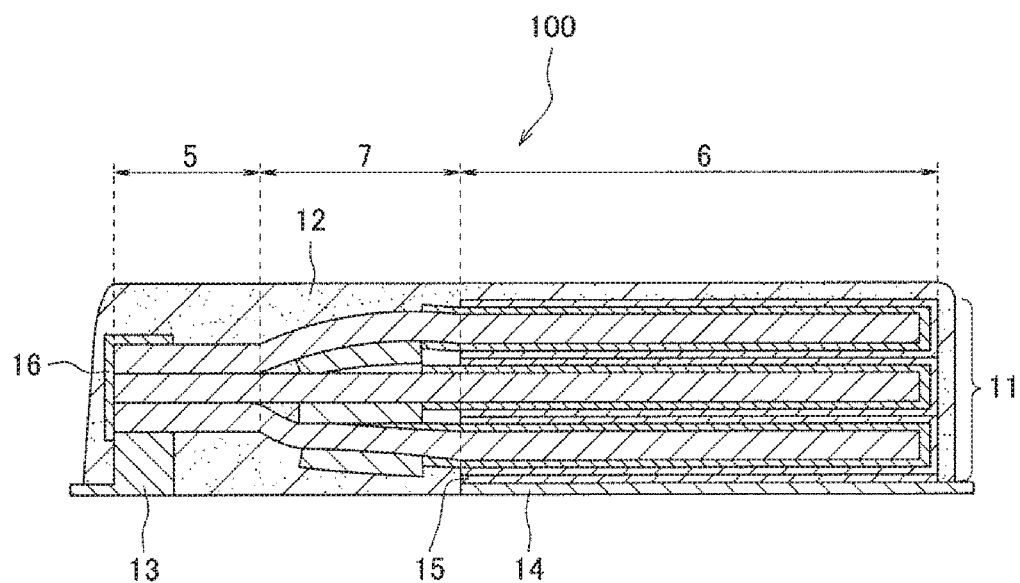
FIG. 3 is a schematic cross-sectional view illustrating a solid electrolytic capacitor including the capacitor element group of FIG. 2.

With reference to FIGS. 1 to 3, a solid electrolytic capacitor according to a first exemplary embodiment of the present disclosure will be described in detail. FIG. 1 is a schematic cross-sectional view illustrating capacitor element 10 according to this exemplary embodiment. FIG. 2 is a schematic cross-sectional view illustrating capacitor element group 11 made up of a plurality of laminated capacitor elements 10 (10a to 10c). FIG. 2 shows an example of three laminated capacitor elements. FIG. 3 is a schematic cross-sectional view illustrating solid electrolytic capacitor 100 including capacitor element group 11.

Capacitor element 10 includes foil-shaped anode body 1 having a dielectric layer (not shown), solid electrolyte layer 2 covering a part of the dielectric layer, and cathode lead-out layer 3 covering at least a part of solid electrolyte layer 2. Anode body 1 has first main surface S1 and second main surface S2 that are opposite to each other. Anode body 1 includes anode section 1P, cathode formation section 1N, and separation section 1S interposed between anode section 1P and cathode formation section 1N. First insulating layer 4 is disposed on first main surface S1 of separation section 1S.

Anode section 1P constitutes anode region 5 of the capacitor element. Cathode formation section 1N, solid electrolyte layer 2, and cathode lead-out layer 3 constitute cathode region 6 of the capacitor element. Separation section 1S and first insulating layer 4 constitute separation region 7 of the capacitor element.

Capacitor element group 11 includes a plurality of capacitor elements 10. With reference to FIG. 2, capacitor elements 10 each include first main surface S1 having first insulating layer 4 formed thereon and second main surface S2 having none of first insulating layer 4. Capacitor elements 10 are stacked such that first main surface S1 of one of mutually adjacent capacitor elements 10 faces second main surface S2 of other adjacent capacitor element 10. Thus, first insulating layer 4 disposed on capacitor element 10a faces second main surface S2 of separation region 7 of capacitor element 10b adjacent to capacitor element 10a, for example. No insulating component exists between first insulating layer 4 and separation region 7 of the capacitor element adjacent to first insulating layer 4.

With reference to FIG. 3, solid electrolytic capacitor 100 includes capacitor element group 11, exterior body 12 to encapsulate capacitor element group 11, anode terminal 13 electrically connected to anode regions 5, and cathode terminal 14 electrically connected to cathode regions 6. Exterior body 12 is a substantially rectangular parallelepiped in outer shape and thus solid electrolytic capacitor 100 is a substantially rectangular parallelepiped in outer shape.

Anode regions 5 of capacitor elements 10 are swaged together by swaging component 16. Anode terminal 13 is joined to first main surface S1 of one of a plurality of swaged anode regions 5 by welding. Cathode terminal 14 is joined to first main surface S1 of one of a plurality of cathode regions 6 through conductive adhesive 15.

A lower surface of exterior body 12 exposes at least a part of anode terminal 13 and at least a part of cathode terminal 14 to the outside. These exposed parts are used for, for example, solder connection to a substrate (not shown) on which solid electrolytic capacitor 100 is to be mounted. The shapes and dispositions of the terminals are not limited to those in this illustration.

These terminals may be replaced with strip-shaped terminals, for example. In this case, strip-shaped terminals are connected to an anode region and a cathode region respectively such that parts of the respective terminals jut out of an exterior body. After that, the parts of the terminals jutting out of the exterior body are bent along an outer shape of the exterior body.

SECOND EXEMPLARY EMBODIMENT

Figure 4:
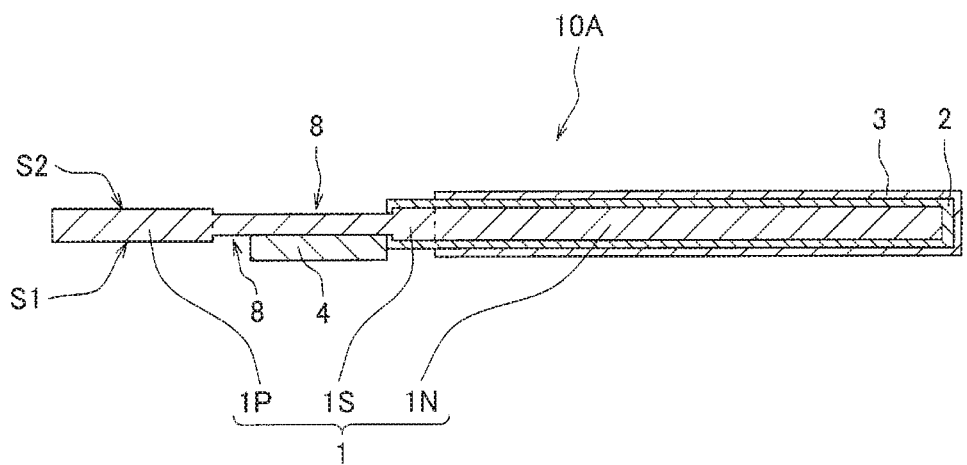
FIG. 4 is a schematic cross-sectional view illustrating a capacitor element according to a second exemplary embodiment of the present disclosure.
Figure 5:
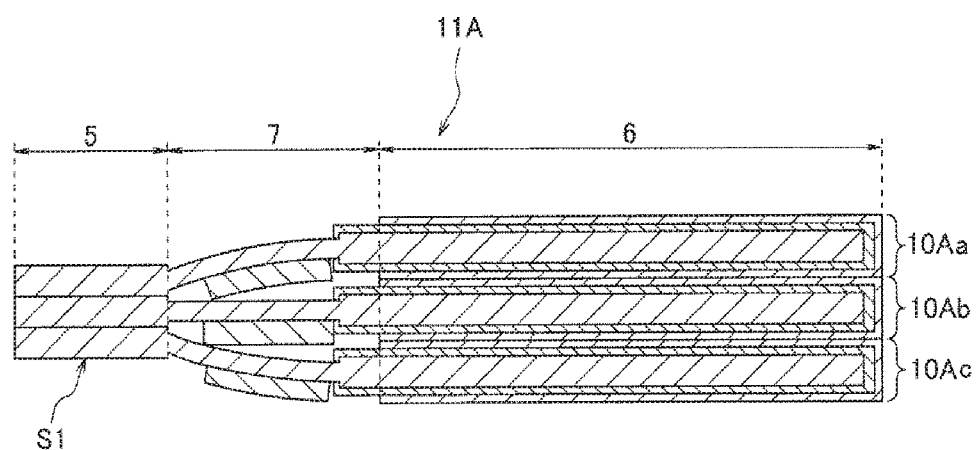
FIG. 5 is a schematic cross-sectional view illustrating a capacitor element group made up of a plurality of the laminated capacitor elements of FIG. 4.

With reference to FIGS. 4 and 5, a solid electrolytic capacitor according to this exemplary embodiment is similar to the solid electrolytic capacitor of the first exemplary embodiment except for separation section 1S of anode body 1 having recess 8 that is dented in a thickness direction of separation section 1S. FIG. 4 is a schematic cross-sectional view illustrating capacitor element 10A according to the second exemplary embodiment. FIG. 5 is a schematic cross-sectional view illustrating capacitor element group 11A made up of a plurality of laminated capacitor elements 10A (10Aa to 10Ac). This configuration, as described above, prevents the solid electrolyte layer from crawling up and contributes to a reduction in the overall thickness of the capacitor element group.

THIRD EXEMPLARY EMBODIMENT

Figure 6A:
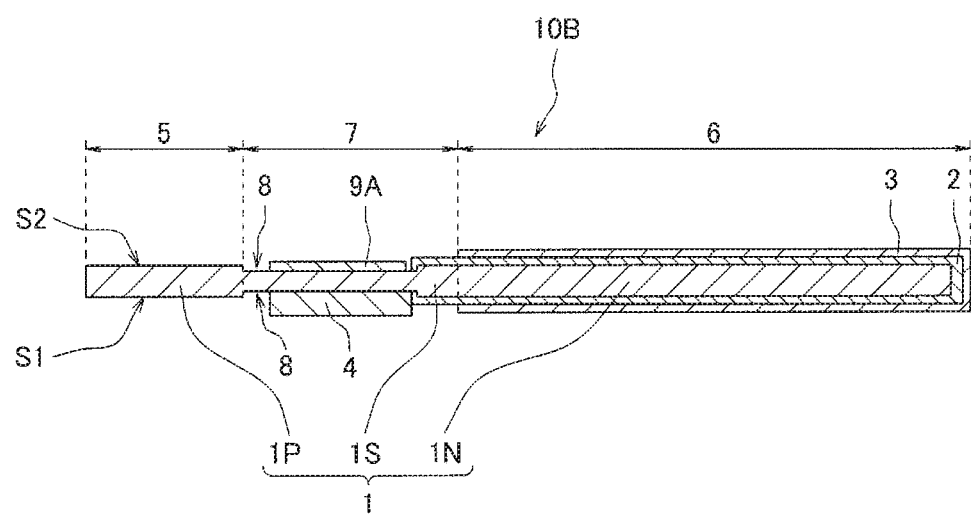
FIG. 6A is a schematic cross-sectional view illustrating a capacitor element according to a third exemplary embodiment of the present disclosure.

With reference to FIG. 6A, a solid electrolytic capacitor according to this exemplary embodiment is similar to the solid electrolytic capacitor of the second exemplary embodiment except that capacitor elements 10B each have second insulating layer 9A disposed on a part of a second main surface of separation section 1S of an anode body. FIG. 6A is a schematic cross-sectional view illustrating capacitor element 10B according to the third exemplary embodiment. This configuration helps to more effectively prevent the occurrence of a short circuit between the capacitor elements.

FOURTH EXEMPLARY EMBODIMENT

Figure 6B:
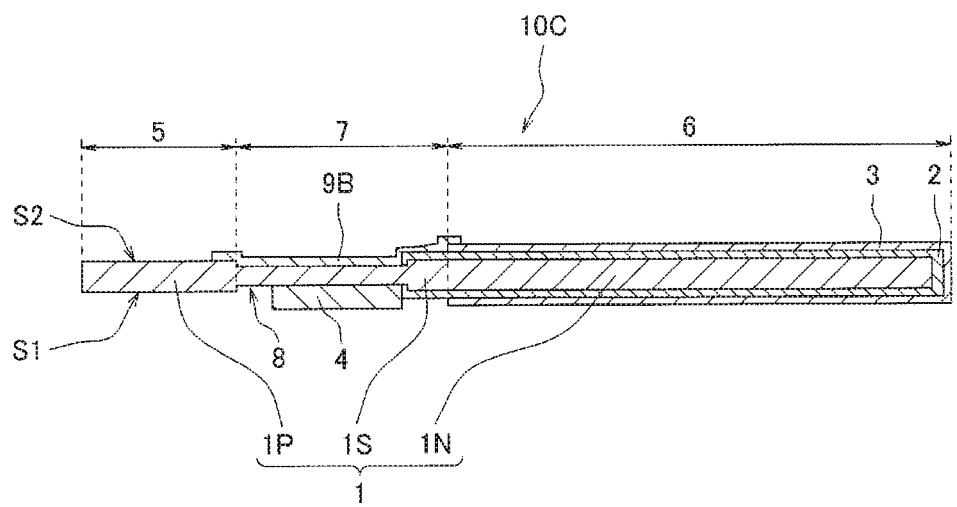
FIG. 6B is a schematic cross-sectional view illustrating a capacitor element according to a fourth exemplary embodiment of the present disclosure.

With reference to FIG. 6B, a solid electrolytic capacitor according to this exemplary embodiment is similar to the solid electrolytic capacitor of the second exemplary embodiment except that capacitor elements 10C each have second insulating layer 9B. Second insulating layer 9B is disposed on second main surface S2 of each anode body such that second insulating layer 9B is put on a part of separation section 1S and a part of anode section 1P of the anode body, as well as a part of a cathode layer (solid electrolyte layer 2 and/or cathode lead-out layer 3) formed on second main surface S2 of cathode formation section 1N. FIG. 6B is a schematic cross-sectional view illustrating capacitor element 10C according to the fourth exemplary embodiment. This configuration helps to more effectively prevent the occurrence of a short circuit between the capacitor elements and prevents degradation of the solid electrolyte layer.

Method for Manufacturing Solid Electrolytic Capacitor

A solid electrolytic capacitor according to any of the exemplary embodiments is manufactured by a method including steps below: a first step of preparing a foil-shaped anode body that has a dielectric layer as well as a first main surface and a second main surface opposite to each other; a second step of forming a first insulating layer on each of the first and the second main surfaces at a position by which the anode body is separated into two regions; a third step of forming a solid electrolyte layer and a cathode lead-out layer on both the first and the second main surfaces of one of the regions; a fourth step of removing, after the third step, the first insulating layer from the second main surface to obtain a capacitor element; and a fifth step of stacking a plurality of the capacitor elements.

A method for manufacturing a solid electrolytic capacitor according to any of the exemplary embodiments of the present disclosure will now be described in detail.

(First Step) Preparation of Anode Body

An anode body containing metallic foil is made by a known method.

The anode body is obtained, for example, by roughening a surface of a foil-shaped substrate that contains a valve metal. The roughening is satisfactory as long as irregularities are formed on the surface of the substrate and may be performed, for example, by subjecting the surface of the substrate to etching (e.g., electrolytic etching) or by depositing particles of the conductive material on the surface of the substrate by use of a gas phase method such as vapor deposition. Next, a dielectric layer is formed on a surface of the anode body. The dielectric layer is formed by anodizing the surface of the anode body. The anodization can be performed by a known method, for example, an anodizing treatment. The anodizing treatment can be performed by, for example, immersing the anode body in an anodizing solution to impregnate the anode body with the anodizing solution and applying a voltage between the anode body as an anode and a cathode immersed in the anodizing solution.

After the first step, a process seventh step) for forming a recess on a separation section of the anode body may be performed before a second step described later. This process includes compressing, in a thickness direction of the anode body, a portion where the separation section is to be formed through press working or other processing so as to depress a first main surface and a second main surface of the anode body. The formed recess helps to prevent a solid electrolyte layer from crawling up in a third step.

(Second Step) Separation of Anode Body

A first insulating layer is formed on each of the first and the second main surfaces at a position by which the obtained anode body is separated into two regions.

The first insulating layer may be formed by applying a first liquid insulating material containing an insulating resin to a predetermined location or by sticking a first insulation tape substance containing an insulating resin onto the predetermined location. Preferably, the first insulating layer should be formed from the first insulation tape substance. This makes formation of the first insulating layer easier and facilitates removal of the first insulating layer disposed on one of the main surfaces in a fourth step.

(Third Step) Formation of Cathode Layer (Solid Electrolyte Layer and Cathode Lead-Out Layer)

The following description exemplifies a solid electrolyte layer containing a conductive polymer.

The solid electrolyte layer containing the conductive polymer may be formed, for example, by a method of impregnating a material with a monomer or an oligomer and polymerizing the material chemically or electrolytically. Alternatively, such a solid electrolyte layer may be formed by impregnating a material with a conductive polymer solution or dispersion liquid and drying the material.

Next, at least a part of a surface of the formed solid electrolyte layer is coated with a carbon paste and a silver paste in this order such that a cathode lead-out layer made up of a carbon layer and a silver paste layer is formed. The cathode lead-out layer is not limited to this configuration and is satisfactory as long as the cathode lead-out layer has a function of current collection.

(Fourth Step) Removal of First Insulating Layer

Among the first insulating layers formed on both the first and the second main surfaces, which are at respective positions corresponding to each other, of the anode body, the first insulating layer formed on the second main surface is removed. No particular limitation is placed on a method of removing the first insulating layer. For example, a first insulating layer formed from the first insulation tape substance may be detached gradually from an end of the tape substance.

After the fourth step, a process (a sixth step) may be performed to form a second insulating layer that is thinner than the first insulating layer on the second main surface at the position from which the first insulating layer has been removed. The second insulating layer may as well be formed by applying a second liquid insulating material to a predetermined location or by sticking a second insulation tape substance onto the predetermined location.

In the second step, a second insulating layer may be disposed on the second main surface instead of disposing the first insulating layer. In this case, the fourth and the sixth steps can be omitted. However, in terms of providing reliable insulation between an anode region and a cathode region of a capacitor element, a preferable method should include forming a second insulating layer after processes of forming a first insulating layer on a second main surface, forming a cathode layer, and removing the first insulating layer.

(Fifth Step) Formation of Capacitor Element Group

A plurality of capacitor elements that each include the first insulating layer and the second insulating layer formed on the anode body as described above are stacked so as to form a capacitor element group.

The capacitor elements in the capacitor element group are stacked such that the first insulating layer of one of the mutually adjacent capacitor elements faces the second main surface (or the second insulating layer) of the other adjacent capacitor element. The second main surface of the other adjacent capacitor element has no first insulating layer because the first insulating layer formed on the second main surface is removed. The anode regions of the capacitor elements are swaged by a swaging component or welded together such that these regions are electrically connected to each other.

Lastly, an anode terminal and a cathode terminal are joined respectively to the anode region and the cathode region of any capacitor element of the capacitor element group. The capacitor element group is encapsulated in an exterior body so that a solid electrolytic capacitor is manufactured.

A solid electrolytic capacitor according to the present disclosure allows the disposition of more capacitor elements in a limited space and offers high performance in preventing positional discrepancy and short circuits. Thus, the solid electrolytic capacitor can be used in various applications.

What is claimed is:

1. A solid electrolytic capacitor comprising a plurality of capacitor elements that are laminated with each other,
   the plurality of capacitor elements each comprising:
      an anode body having a dielectric layer;
      a solid electrolyte layer covering a part of the dielectric layer; and
      a cathode lead-out layer covering at least a part of the solid electrolyte layer, wherein:
   the anode body is a foil-shaped electric conductor having a first main surface and a second main surface opposite to the first main surface, the anode body including an anode section, a cathode formation section, and a separation section disposed between the anode section and the cathode formation section,
   the solid electrolyte layer and the cathode lead-out layer are disposed on both the first main surface of the cathode formation section and the second main surface of the cathode formation section,
   a first insulating layer is disposed on an exposed surface of the first main surface of the separation section and is spaced apart from the cathode lead-out layer, the exposed surface being exposed from the solid electrolyte layer,
   the plurality of capacitor elements includes a first capacitor element and a second capacitor element that are adjacent to each other, the first capacitor element and the second capacitor element being stacked so that the first insulating layer in the first capacitor element faces the second main surface of the separation section in the second capacitor element,
   an end of the first insulating layer of the first capacitor element abuts on an end of the solid electrolyte layer of the second capacitor element, the end of the solid electrolyte layer being at a side close to the separation section of the second capacitor element, and
   a thickness of the first insulating layer is less than a total thickness of the solid electrolyte layer and the cathode lead-out layer of the first capacitor element and the solid electrolyte layer and the cathode lead-out layer of the second capacitor element.

2. The solid electrolytic capacitor according to claim 1, wherein no insulating layer is disposed on the second main surface of the separation section.

3. The solid electrolytic capacitor according to claim 1, wherein the thickness of the first insulating layer is greater than a total thickness of the solid electrolyte layer and the cathode lead-out layer of the first capacitor element.

4. The solid electrolytic capacitor according to claim 1, wherein the separation section of the anode body has a recess.

5. The solid electrolytic capacitor according to claim 4, wherein the first insulating layer is disposed only in the recess in the separation section of the anode body.

6. The solid electrolytic capacitor according to claim 1, wherein the first insulating layer includes a silicone component.

7. The solid electrolytic capacitor according to claim 1, further comprising:
   an anode terminal electrically connected to the anode body in each of the plurality of capacitor elements; and
   a cathode terminal electrically connected to the cathode lead-out layer in each of the plurality of capacitor elements, wherein:
   the anode terminal is joined to the first main surface of the anode section of the anode body, and
   the cathode terminal is joined to the cathode lead-out layer on the first main surface of the anode body.

* * * * *